United States Patent [19]

Snyder

[11] Patent Number: 5,423,451

[45] Date of Patent: Jun. 13, 1995

[54] BOWL AND CUTTING BOARD COMBINATION

[76] Inventor: Robert E. Snyder, 2901 Bammel La., No. 33, Houston, Tex. 77098

[21] Appl. No.: 78,504

[22] Filed: Jun. 21, 1993

[51] Int. Cl.[6] .............................................. B65D 43/00
[52] U.S. Cl. ..................................... 220/574; 220/212; 220/307; 206/216; 217/56
[58] Field of Search .................. 217/56, 124; 220/574, 220/212, 307; 206/216

[56] References Cited

U.S. PATENT DOCUMENTS

| 104,016 | 6/1870 | Gilliland | 217/56 |
|---|---|---|---|
| 875,276 | 12/1907 | Mengel | 217/56 |
| 1,456,582 | 5/1923 | Wood et al. | 217/56 |
| 1,891,151 | 12/1932 | Florang | 217/56 |
| 1,918,987 | 7/1933 | Seabold, Sr. | 217/56 |
| 2,223,087 | 1/1940 | Beal | 217/124 |
| 2,401,065 | 5/1946 | Gonzalez | 217/56 |
| 2,406,636 | 8/1946 | Rasor | 217/56 |

OTHER PUBLICATIONS

Kohler Catalogue 1990.

Primary Examiner—Joseph Man-Fu Moy
Attorney, Agent, or Firm—Kenneth A. Roddy

[57] ABSTRACT

A bowl and cutting board combination has a bowl member configured to removably receive and support a cutting board member at its upper end and when supported on the bowl member is used for cutting or preparing foods placed thereon, and thereafter the cutting board is removed and used to transfer the foods thereon which have been cut or prepared into the bowl member. The cutting board member serves as a cutting surface, a food preparation surface, and a handling surface, and the bowl member serves as the support for the cutting board member and as a container for receiving the foods which have been cut or prepared on the cutting board member. The cutting board member optionally serves as a lid for the bowl member to cover the contents of the bowl, before or after cutting or preparation. In another embodiment, the cutting board member is removably received and supported in the top end of an open ended funnel member which is supported on a serving bowl or on a stand above the serving bowl wherein the funnel member serves as the support for the cutting board member and to direct foods into the serving bowl member. The combination may also be used for non-food purposes wherein various materials are contained or stored in the bowl-shaped container and the planar board serves as a lid and as a utility working surface for working with materials stored in the bowl-shaped container.

12 Claims, 3 Drawing Sheets

BOWL AND CUTTING BOARD COMBINATION

BACKGROUND OF THE INVENTION

1. Field of the Invention

This invention relates generally to cutting boards and serving bowls, and more particularly a bowl and cutting board combination wherein the bowl is provided with a removable cutting board for use as a cutting surface or food preparation and handling surface.

2. Brief Description of the Prior Art

Many foods, such as salads, are served in bowls wherein the food is placed in the bowl and dressings may be added and mixed with the food in the bowl. Often it is desirable to cut the food in the bowl into smaller pieces and blend the mixture so as to be more appetizing and more easily handled and eaten. Usually the cutting is done with a knife and fork entirely within the bowl with the interior of the bowl acting as the cutting surface.

This process presents several problems: (1) the interior surface of the bowl will be cut or marked, (2) certain food products, will enter the surface cuts and collect bacteria, particularly raw meats, and (3) the bowl cannot be properly cleaned. Some high quality wooden bowls are expensive and can be ruined, and most plastic bowls generally have soft surfaces which are unsuitable for cutting surfaces.

Common cutting boards are often used in cutting and preparing salads and the like, but the cut materials must then be lifted or scraped into a large bowl for serving or further mixing or preparation. Foods such as citris fruits or sauces will generate liquids which run off common boards and are lost or make a mess on counter tops or table tops.

There are several patents which disclose various cutting board devices.

Haskins et al, U.S. Pat. No. 4,653,737 discloses a cutting board having one or more large openings and channels on the underside which slidably receive the upper end of a catch basin.

Crowhurst, U.S. Pat. No. 4,273,318 discloses a cutting board which has a tray which attaches magnetically to extend from one end of the cutting board such that food articles can be chopped and collected in the tray, then emptied by upending the combined cutting board and tray or by disengaging the tray.

Blackstone, U.S. Pat. No. 4,790,097 discloses fish bait cutting device which has an octagonal cutting block permanently secured to the bottom of a tub at the center wherein the perpendicular sides of the octagonal cutting block are spaced inward from the inner walls of the tub to form a surrounding reservoir to collect cuttings and hold cutting tools.

Shamoon, U.S. Pat. No. 4,041,964 discloses a cutting board which fits over a sink basin and has a depending flange on the front side which engages the countertop and has an opening which receives a wire basket.

Huppert, U.S. Pat. No. 4,765,603 discloses a square cutting board having outwardly extending legs at the corners which allow the cutting board to be suspended over a sink basin.

Leavens, U.S. Pat. No. 4,456,021 discloses a combination kitchen sink having at least one basin and a support rail on opposite sides, a colander slidably disposed on the support rails and a cutting board slidably disposed above the colander.

The present invention is distinguished over the prior art in general, and these patents in particular by a bowl and cutting board combination which has a bowl member configured to removably receive and support a cutting board member at its upper end and when supported on the bowl member is used for cutting or preparing foods placed thereon, and thereafter the cutting board is removed and used to transfer the foods thereon which have been cut or prepared into the bowl member. The cutting board member serves as a cutting surface, a food preparation surface, and a handling surface, and the bowl member serves as the support for the cutting board member and as a container for receiving solid and liquid foods which have been cut or prepared on the cutting board member. The cutting board member optionally serves as a lid for the bowl member to cover the contents of the bowl, before or after cutting or preparation. In another embodiment, the cutting board member is removably received and supported in the top end of an open ended funnel member which is supported on a serving bowl or on a stand above the serving bowl wherein the funnel member serves as the support for the cutting board member and to direct foods into the serving bowl member. The combination may also be used for non-food purposes wherein various materials are contained or stored in the bowl-shaped container and the planar board serves as a lid and as a utility working surface for working with materials stored in the bowl-shaped container.

SUMMARY OF THE INVENTION

It is therefore an object of the present invention to provide a bowl and cutting board combination wherein the bowl is provided with a removable cutting board for use as a cutting surface or food preparation/handling surface.

It is another object of this invention to provide a bowl and cutting board combination wherein a removable cutting board is removably received and supported on the bowl member to be used for cutting or preparing foods placed thereon, and thereafter said cutting board is removed and used to transfer the foods thereon which have been cut or prepared into the bowl member.

Another object of this invention is to provide a bowl and cutting board combination wherein the cutting board member serves as a cutting surface, a food preparation surface, and a handling surface, and the bowl member serves as the support for the cutting board member and as a container for receiving the foods which have been cut or prepared on the cutting board member, and the cutting board member can optionally serve as a lid for covering the contents of the bowl, before or after cutting or preparation.

Another object of this invention is to provide a bowl and cutting board combination which has a cutting board removably supported on a bowl member for use as a surface for food cutting or preparation to prevent damage to the surface of the bowl.

Another object of this invention to provide a bowl and cutting board combination wherein each of the components are separable and can be easily cleaned as required.

A further object of this invention is to provide a bowl and cutting board combination which is aesthetically pleasing, economical to manufacture, and rugged and durable in use.

A still further object of this invention is to provide a bowl-shaped container for containing materials and a planar board member removably received and supported thereon wherein the planar board serves as a lid and as a utility working surface for working with materials stored in the bowl-shaped container.

Other objects of the invention will become apparent from time to time throughout the specification and claims as hereinafter related.

The above noted objects and other objects of the invention are accomplished by a bowl and cutting board combination which has a bowl member configured to removably receive and support a cutting board member at its upper end and when supported on the bowl member is used for cutting or preparing foods placed thereon, and thereafter the cutting board is removed and used to transfer the foods thereon which have been cut or prepared into the bowl member. The cutting board member serves as a cutting surface, a food preparation surface, and a handling surface, and the bowl member serves as the support for the cutting board member and as a container for receiving solid or liquid foods which have been cut or prepared on the cutting board member. The cutting board member optionally serves as a lid for the bowl member to cover the contents of the bowl, before or after cutting or preparation. In another embodiment, the cutting board member is removably received and supported in the top end of an open ended funnel member which is supported on a serving bowl or on a stand above the serving bowl wherein the funnel member serves as the support for the cutting board member and to direct foods into the serving bowl member. The combination may also be used for nonfood purposes wherein various materials are contained or stored in the bowl-shaped container and the planar board serves as a lid and as a utility working surface for working with materials stored in the bowl-shaped container.

DESCRIPTION OF THE PREFERRED EMBODIMENT

Figure 1:
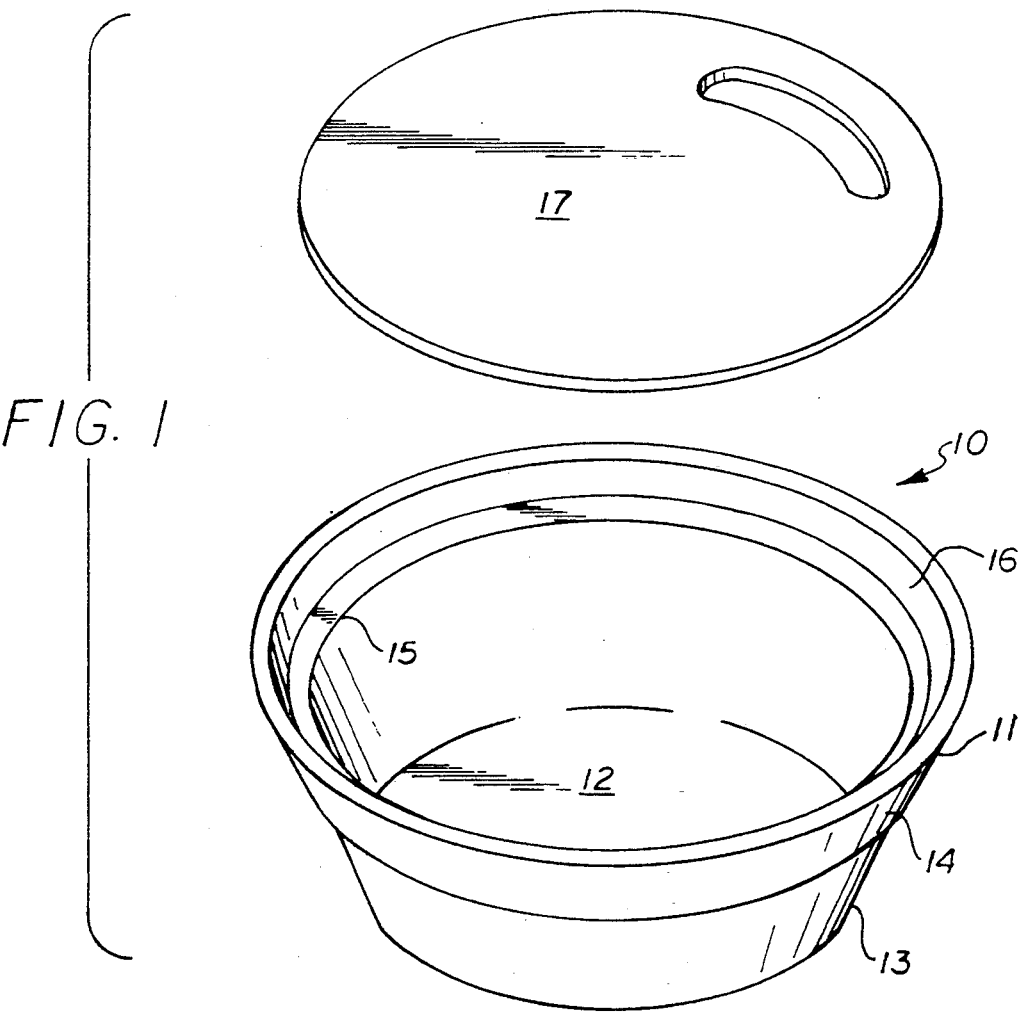
FIG. 1 is an exploded isometric view of a bowl and cutting board combination in accordance with the present invention.
Figure 2:
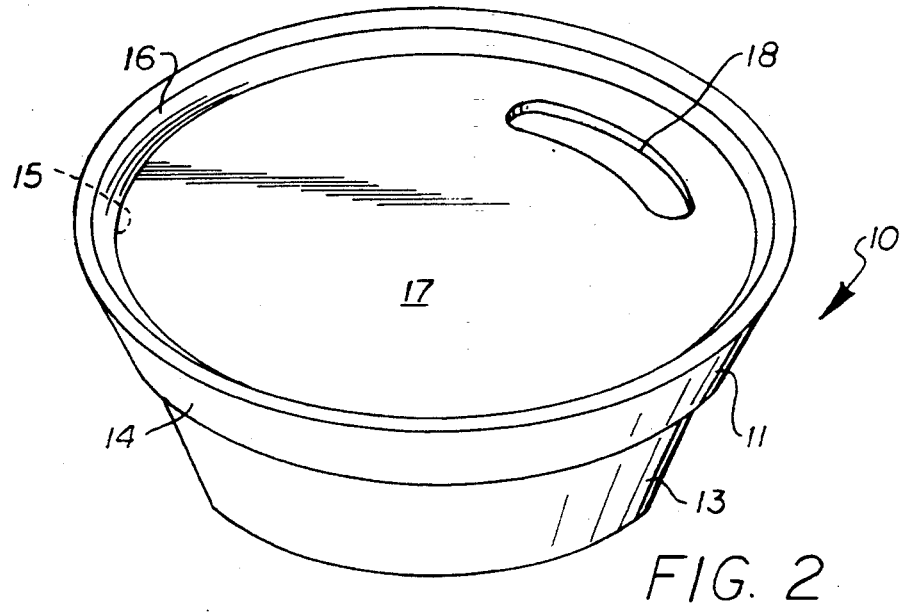
FIG. 2 is a perspective view of the bowl and cutting board combination of FIG. 1 with the cutting board member installed in the bowl member.
Figure 3:
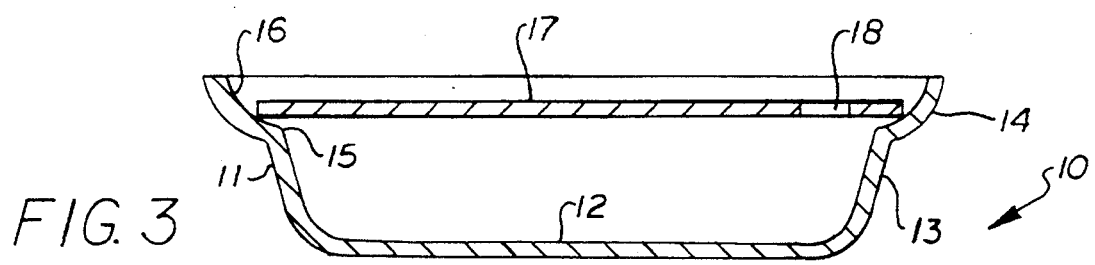
FIG. 3 is a cross sectional view of the bowl and cutting board combination of FIG. 1 with the cutting board member installed in the bowl member.

Referring to the drawings by numerals of reference, there is shown in FIGS. 1, 2, and 3, a preferred circular bowl and cutting board combination 10 in accordance with the present invention. The bowl member 11 is a generally cup-shaped container having a bottom wall 12 and a contiguous side wall 13. The upper portion 14 of the side wall 13 is curved inwardly and then extends downwardly to the bottom wall 12 to define a circular ledge or shoulder 15 and peripheral rim 16 at the top end. The bowl configuration is a relatively shallow and has a flat bottom. The bowl member 11 is formed of wood, plastic, or other suitable material which is easily cleaned.

A flat circular cutting board 17 having an outer diameter larger than the inside diameter of the circular shoulder 15 and smaller than the inside diameter of the rim 16 is removably received in the top end of the bowl 11 and supported on the circular shoulder 15, as seen in FIGS. 2 and 3. Thus, because the shoulder 15 and the cutting board 17 are both circular, the cutting board 17 will not fall into the lower portion of the bowl 11. The cutting board member 17 is formed of wood, plastic, or other material suitable for use with a sharp knife and is easily cleaned.

Figure 4:
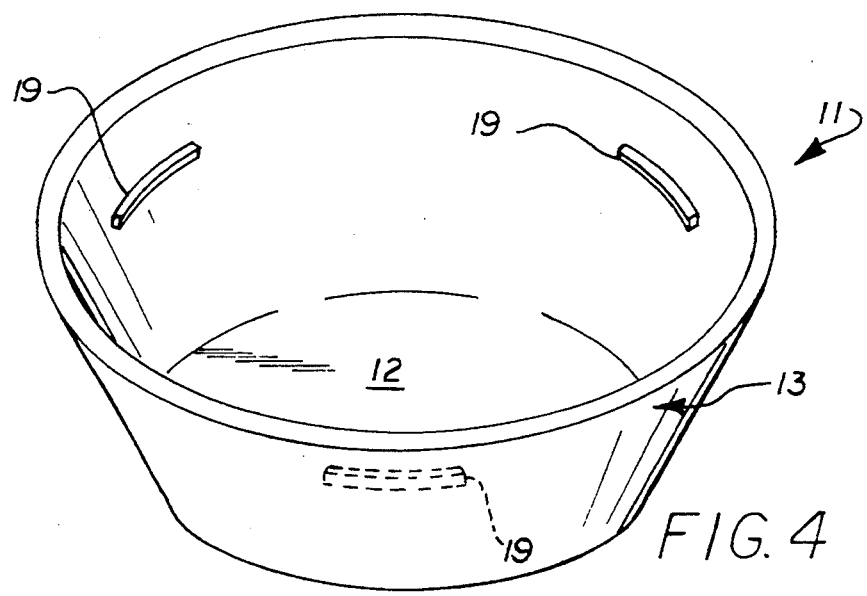
FIG. 4 is a perspective view of another embodiment of the bowl member of the bowl and cutting board combination.

Alternatively, as shown in FIG. 4, the interior of the bowl 11 may curve continuously inward as in a common bowl, i.e., without a continuous shoulder 15. In this embodiment, the upper portion of the side wall 13 is provided with several small circumferentially spaced lugs or protrusions 19 which extend a short distance inwardly from the side wall 13 to form a segmented ledge or shoulder for supporting the cutting board. In a preferred embodiment, the cutting board 17 has an aperture 18 near the outside edge to receive one or more fingers of the user for removing the cutting board from the bowl 11. In the example illustrated in FIGS. 1-3, the aperture 18 is an arcuate slot, however, the aperture may be one or more small circular holes.

Figure 5:
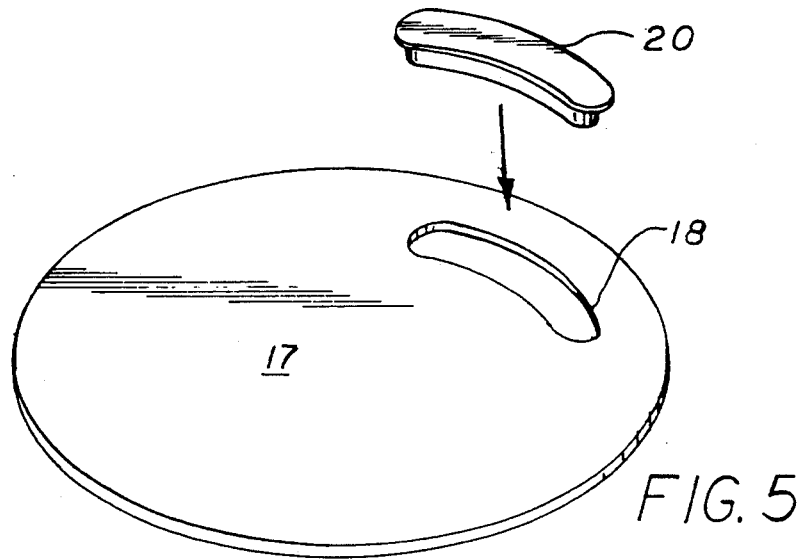
FIG. 5 is a perspective view of a cutting board member which has an aperture for handling the cutting board and a plugging cap for sealing the aperture.

As shown in FIG. 5, an arcuate plug 20 formed of wood or plastic may be provided for sealing the aperture 18 while the cutting board 17 is in use as a cutting surface or as a protective cover. The plug 20 conforms generally to the curvature of the aperture 18 and has a lower portion 20A which is approximately the same thickness as the cutting board 17 and has a width which is slidably received in the aperture. The plug 20 has a thin upper section 20B which is slightly larger than the aperture 18 to completely cover the aperture when the plug is installed. When installed, the plug 20 covers the aperture 18 and allows full use of the cutting board surface. The relatively small space occupied by the aperture 18 and its location near the outer edge make it unneccessary to actually cut on the surface of the upper section 20B of the plug 20.

The cutting board 17 is placed on top of the circular shoulder 15 (FIG. 1) or the protrusions 19 (FIG. 4) of the empty bowl 11 by the user inserting his or her fingers into the aperture 18, and is supported thereon. The food to be cut and/or mixed is placed on the top surface of the cutting board 17. The food which has been placed on the top surface of the cutting board 17 can then be easily cut with a knife and mixed with dressings, or otherwise prepared, while they are on the top surface. The circular rim 16 extends a short distance above the top surface of the cutting board 17 and provides a surrounding lip to prevent loose foods or liquids from spilling onto the table or countertop.

Figure 6:
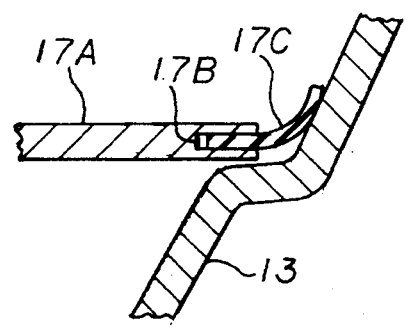
FIG. 6 is a partial cross section of a modified cutting board member which provides a seal between the outer periphery of the cutting board and the interior of the bowl side wall.

FIG. 6 shows a modification of the cutting board 17A which provides an effective liquid seal between the outer periphery of the cutting board and the interior of the bowl side wall 13. In this modification, the outer periphery of the cutting board 17A is provided with a continuous slot 17B which extends inwardly a short distance. A thin, flat, flexible seal ring 17C formed of resilient material, such as rubber, has its inner diameter received within the slot 17B and its outer diameter extends outwardly a short distance to provide a flexible seal surrounding the outer periphery of the cutting board 17A.

After the food has cut and/or mixed, the user can then remove the plug 20 and lift the cutting board 17 from the shoulder 16 or protrusions 19 by again inserting his or her fingers into the aperture 18. The food which has been cut and/or mixed is then dumped or scraped into the bowl 11. If desired, the cutting board 17 can be turned over and used as a lid for the bowl 11 to protect or preserve the contents of the bowl, before or after preparation.

Figure 7:
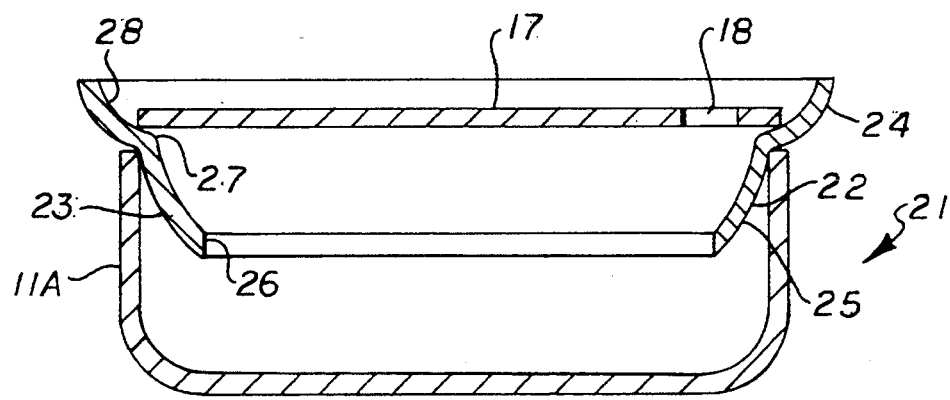
FIG. 7 is a cross sectional view of a bowl and cutting board combination having an intermediate member installed between the cutting board and a serving bowl.

FIG. 7 shows another embodiment of the bowl and cutting board combination 21 wherein an ordinary serving bowl is used in combination with an intermediate funnel member 22 placed in the top of the serving bowl 11A. The intermediate funnel member 22 is a shallow, generally cup-shaped hollow member open at both ends. The intermediate funnel member 22 is formed of wood, plastic, or other suitable material which is easily cleaned.

The intermediate funnel member 22 has a side wall 23 configured to be received in the open top end of the bowl 11A. The exterior of the side wall 23 of the intermediate funnel member 22 has an upper portion 24 which is larger in diameter than the inside diameter of the bowl 11A and a lower portion 25 smaller in diameter than the inside diameter of the bowl. Thus, the intermediate funnel member 22 is removably supported on the circular top edge of the bowl 11A with its lower portion 24 and open bottom end 26 inside the bowl and its upper portion 25 extending above the top edge of the bowl.

The interior of the upper portion 24 of the funnel member side wall 23 is curved inwardly and then extends downwardly to the open bottom end 26 to define a circular ledge or shoulder 27 and peripheral rim 28 at the top end.

In the embodiment of FIG. 7, the intermediate funnel member 22 is placed in the top of the bowl 11A. The cutting board 17 is placed into the top of the funnel member 22 by the user inserting his or her fingers into the aperture 18, and is supported on the circular shoulder 27. The food to be cut and/or mixed is placed on the top surface of the cutting board 17 and can then be easily cut with a knife and mixed with dressings, or otherwise prepared, while it is on the top surface. After the food has cut and/or mixed, the user can then lift the cutting board 17 from the shoulder 27 at the top of the intermediate funnel member 22, and the food which has been cut and/or mixed is then dumped or scraped into the intermediate funnel member to be directed into the bowl 11A.

Figure 8:
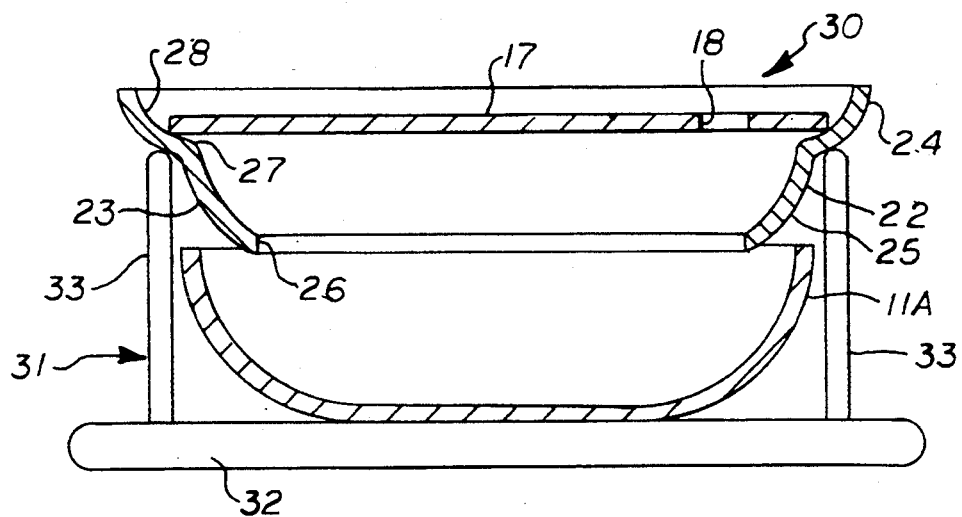
FIG. 8 is a cross sectional view of a bowl and cutting board combination having an intermediate member supported above the serving bowl on a stand.

FIG. 8 shows another embodiment of the bowl and cutting board combination 30 wherein an ordinary serving bowl is used in combination with the intermediate funnel member 22 supported above the serving bowl 11A on a stand 31 having a flat base 32 and leg members 33 extending vertically upward therefrom. The stand 31 is sized to receive an ordinary serving bowl 11A on the base 32. The exterior of the side wall 23 of the intermediate funnel member 23 is configured to be removably received and supported on the top ends of the legs 33 with its open bottom end 26 extending a short distance into, or just above, the bowl 11A. The interior of the upper portion 24 of the side wall 23 is curved inwardly and then extends downwardly to the open bottom end 26 to define a circular ledge or shoulder 27 and peripheral rim 28 at the top end, as described previously.

In the embodiment of FIG. 8, the intermediate funnel member 22 is placed on the top ends of the legs 33. The cutting board 17 is placed in the top of the intermediate funnel member 22 by the user inserting his or her fingers into the aperture 18 and is supported on the circular shoulder 27. The food to be cut and/or mixed is placed on the top surface of the cutting board 17 and can then be easily cut with a knife and mixed with dressings, or otherwise prepared, while it is on the top surface. After the food has cut and/or mixed, the user can then lift the cutting board 17 from the circular shoulder 27, and the food which has been cut and/or mixed is then dumped or scraped into the intermediate funnel member 22 to be directed into the bowl 11A.

Although a stand having a base member with vertical legs has been shown, by way of example, it should be understood that the stand may be provided with other vertical support means for supporting the intermediate funnel member.

It should also be understood, that in the illustrated embodiments, the bowl and cutting board members are shown as circular to take advantage of the fact that a circular cutting board cannot fall through a circular rim or ledge. However they may be provided in various other polygonal configurations.

Other Uses

It should also be understood that the structure described herein may also be used for various other purposes. For example, the bowl may be used for storing non-food items and the cutting board may be used as a utility working surface.

The combination of the bowl and board may be used for storing modeling clay or similar handcraft items, wherein clay or other material may be stored in the bowl and when the cutting board or utility board is placed on the bowl it serves as a smooth flat working surface for working or modeling the clay.

Various electrical or mechanical parts may be stored in the bowl and when the cutting board or utility board is placed on the bowl it serves as a smooth flat working surface for assembly, gluing, soldering, etc. of the parts.

Toys and other small items may be stored in the bowl and when the cutting board or utility board is placed on the bowl it serves as a smooth flat working surface for playing with the toys, etc. The board member serves as a lid for the bowl member to cover the contents of the bowl, before or after using the contents, and keeps the small items in a convenient location. For example, the bowl may be used for storing non-food items and the cutting board may be used as a utility working surface.

While this invention has been described fully and completely with special emphasis upon a preferred embodiment, it should be understood that within the scope of the appended claims the invention may be practiced otherwise than as specifically described herein.

I claim:

1. A food bowl and cutting board combination for cutting, preparing, handling, and containing various foods comprising;

a food bowl member for containing various foods, said food bowl member having a flat bottom wall for supporting said bowl on a flat surface, a contiguous side wall, an open top end, and an inwardly projecting horizontal shoulder defining an interior cutting board support surface a short distance below said open top end to removably receive and support a cutting board member, a flat planar cutting board member having an outer periphery shaped to closely conform to said food bowl member open top end removably received therein and supported on said cutting board support surface for cutting or preparing foods placed thereon, and being removed therefrom to transfer the foods thereon which have been cut or prepared into said food bowl member, said food bowl member open top end being sized and shaped to surround the outer periphery of said cutting board member and extend a short distance above the top surface of said cutting board member when said cutting board member is received therein and supported on said food bowl member cutting board support surface, and an aperture near said cutting board member outer periphery sized to receive one or more fingers of a user for installing and removing said cutting board member from said cutting board support surface and for manipulating said cutting board member in transferring foods into said food bowl member, said cutting board member functioning as a cutting surface, a food preparation surface, and a handling surface, and said food bowl member functioning as the support for said cutting board member and as a container for receiving the foods which have been cut or prepared on said cutting board member, and said cutting board member functioning as a lid for said food bowl member to cover the contents of the bowl, before or after cutting or preparation.

2. The food bowl and cutting board combination according to claim 1 including resilient seal means on said cutting board outer periphery for forming a liquid sealing relation with the interior of said open top end when said cutting board member is received therein and supported on said cutting board support surface.

3. The food bowl and cutting board combination according to claim 1 wherein said food bowl member contiguous side wall is curved inwardly and then downwardly from said open top end to form said horizontal shoulder defining said interior cutting board support surface and to form a peripheral rim above said horizontal shoulder.

4. The food bowl and cutting board combination according to claim 1 wherein said inwardly projecting horizontal shoulder comprises a plurality of small circumferentially spaced horizontal protrusions disposed a short distance below said open top end protruding radially inward a short distance to define a segmented cutting board support surface.

5. The food bowl and cutting board combination according to claim 1 including a plug member having a lower portion sized and shaped to be removably received within said aperture and an upper portion which surrounds and completely covers said aperture when said lower portion is received in said aperture.

6. The food bowl and cutting board combination according to claim 1 wherein said food bowl member is a generally cup-shaped container having a generally circular open top end, and said cutting board member is a flat generally circular disk-shaped configuration.

7. A serving bowl, funnel, and cutting board combination for cutting, preparing, handling, and containing various foods comprising;

a serving bowl member for containing foods and having a flat bottom wall for supporting said serving bowl on a flat surface, a contiguous side wall, and an open top end, a hollow funnel member having an open bottom end, a contiguous side wall, an open top end, an inwardly projecting horizontal shoulder defining an interior cutting board support surface a short distance below said funnel open top end to removably receive and support a cutting board member thereon, and an exterior support surface for supporting said funnel member open top end above said serving bowl member open top end, and a flat planar cutting board member having an outer periphery shaped to closely conform to said funnel member open top end removably received therein and supported on said funnel member cutting board support surface for cutting or preparing foods placed thereon, and being removed therefrom to transfer the foods thereon which have been cut or prepared into said funnel member, said funnel member open top end being sized and shaped to surround the outer periphery of said cutting board member and extend a short distance above the top surface of said cutting board member when said cutting board member is received therein and supported on said funnel member cutting board support surface, and said cutting board member functioning as a cutting surface, a food preparation surface, and a handling surface, and said funnel member functioning as the support for said cutting board member and to direct foods into said serving bowl member, and said serving bowl functioning as a container for receiving the foods which have been cut or prepared on said cutting board member, and said cutting board member functioning as a lid for said serving bowl member to cover the contents thereof, before or after cutting or preparation.

8. The serving bowl, funnel, and cutting board combination according to claim 7 wherein said funnel member contiguous side wall is curved inwardly and then downwardly from its said open top end to form said horizontal shoulder defining said interior cutting board support surface and to form said exterior support surface and a peripheral rim above said interior horizontal shoulder.

9. The serving bowl, funnel, and cutting board combination according to claim 7 wherein said cutting board member has an aperture near said outer periphery sized to receive one or more fingers of a user for installing and removing said cutting board member from said funnel member cutting board support surface and for manipulating said cutting board member in transferring foods into said funnel member, and a plug member having a lower portion sized and shaped to be removably received within said aperture and an upper portion which surrounds and completely covers said aperture when said lower portion is received in said aperture.

10. The serving bowl, funnel, and cutting board combination according to claim 7 wherein
    said funnel member exterior support surface is removably supported on said serving bowl open top end with its said open bottom end inside of said serving bowl member open top end.

11. The serving bowl, funnel, and cutting board combination according to claim 7 including
    a stand member having a base adapted to removably receive said serving bowl member and support means extending vertically upward from said base and terminating above said serving bowl member, and
    said funnel member exterior support surface is removably received and supported on said stand member support means with its said open bottom end closely adjacent said serving bowl open top end.

12. A combination container and removable working surface comprising;
    a bowl-shaped container for containing materials and having a flat bottom wall for supporting said container on a flat surface, a contiguous side wall, an open top end, and an inwardly projecting horizontal shoulder defining an interior support surface a short distance below said open top end to removably receive and support a flat planar board member, and
    a flat planar board member having an outer periphery shaped to closely conform to said container open top end removably received therein and supported on said interior support surface to function as a working surface for working with materials stored in said container,
    said bowl-shaped container open top end being sized and shaped to surround the outer periphery of said planar board member and extend a short distance above the top surface of said planar board member when said planar board member is received therein and supported on said interior support surface,
    an aperture near said outer periphery of said planar board member sized to receive one or more fingers of a user for installing and removing said planar board member from said interior support surface and for manipulating said planar board member in transferring materials into said bowl-shaped container, and
    a plug member having a lower portion sized and shaped to be removably received within said aperture and an upper portion which surrounds and completely covers said aperture when said lower portion is received in said aperture,
    said planar board member functioning as a working surface, a preparation surface, and a handling surface, and said bowl-shaped container functioning as the support for said planar board member and as a container for receiving and storing the materials which have been worked or prepared on said planar board member, and said planar board member functioning as a lid for said bowl-shaped container to cover the contents of said bowl-shaped container, before or after working or preparation.

* * * * *